United States Patent
Guest et al.

(10) Patent No.: US 9,017,501 B2
(45) Date of Patent: Apr. 28, 2015

(54) POLYMERIC COMPONENT AND METHOD OF MAKING

(75) Inventors: Randall V. Guest, Spring, TX (US);
Michael H. Johnson, Katy, TX (US);
Kirk J. Huber, Magnolia, TX (US)

(73) Assignee: Baker Hughes Incorporated, Houston, TX (US)

( * ) Notice: Subject to any disclaimer, the term of this patent is extended or adjusted under 35 U.S.C. 154(b) by 894 days.

(21) Appl. No.: 13/029,743

(22) Filed: Feb. 17, 2011

(65) Prior Publication Data
US 2012/0213979 A1 Aug. 23, 2012

(51) Int. Cl.
| B32B 37/06 | (2006.01) |
| B32B 5/02 | (2006.01) |
| D04H 3/16 | (2006.01) |
| D04H 3/12 | (2006.01) |
| D04H 3/14 | (2012.01) |

(52) U.S. Cl.
CPC .. B32B 5/02 (2013.01); D04H 3/16 (2013.01); D04H 3/12 (2013.01); D04H 3/14 (2013.01)

(58) Field of Classification Search
CPC   B29C 47/0014; B29C 47/0023; B29C 33/52; B29C 65/02; B29C 53/822; B29C 33/448
USPC ............ 156/155, 180, 181, 305, 244.24, 278, 156/276; 166/278, 276; 264/49, 221
See application file for complete search history.

(56) References Cited

U.S. PATENT DOCUMENTS

| 1,352,493 A | 9/1920 | Wolffgram |
| 3,089,187 A | 5/1963 | Wolfe |
| 3,099,318 A | 7/1963 | Miller et al. |
| 3,205,289 A | 9/1965 | Carpenter |
| 3,371,793 A | 3/1968 | Fowler |
| 3,408,925 A | 11/1968 | Bushmeyer |
| 3,494,281 A | 2/1970 | Warnking |
| 3,515,610 A | 6/1970 | Comastri et al. |
| 3,520,250 A | 7/1970 | Molitorisz |
| 3,566,653 A | 3/1971 | Unrath |
| 3,695,076 A | 10/1972 | Kocks |
| 3,892,832 A | 7/1975 | Schey |
| 3,933,557 A | 1/1976 | Pall |
| 4,214,612 A | 7/1980 | de Putter |

(Continued)

FOREIGN PATENT DOCUMENTS

| EP | 0177167 A1 | 4/1986 |
| JP | 06-047219 A | 2/1994 |

(Continued)

OTHER PUBLICATIONS

International Search Report and Written Opinion, International Application No. PCT/US2012/021274, Date of Mailing Aug. 17, 2012, Korean Intellectual Property Office, International Search report 5 pages, Written Opinion 7 pages.

(Continued)

*Primary Examiner* — Jacob T Minskey
*Assistant Examiner* — Vishal I Patel
(74) *Attorney, Agent, or Firm* — Cantor Colburn LLP

(57) ABSTRACT

A method of making a polymeric component includes, extruding one or more strands of a polymer, halting curing of the one or more strands, forming a mat with the extruded one or more strands, bonding the one or more strands to one another at points of contact therebetween, and curing the one or more strands.

16 Claims, 3 Drawing Sheets

(56) References Cited

U.S. PATENT DOCUMENTS

| | | | |
|---|---|---|---|
| 4,260,096 A | | 4/1981 | Samarynov et al. |
| 4,358,064 A | | 11/1982 | Garneau |
| 4,363,845 A | * | 12/1982 | Hartmann ............... 428/198 |
| 4,474,845 A | | 10/1984 | Hagerman et al. |
| 4,518,340 A | | 5/1985 | Jakobsen et al. |
| 4,545,947 A | | 10/1985 | Bozoarth et al. |
| 4,577,481 A | | 3/1986 | Staat |
| 4,592,782 A | | 6/1986 | Davies |
| 4,621,999 A | | 11/1986 | Gerhardt |
| 4,807,525 A | | 2/1989 | de Brock |
| 4,816,106 A | | 3/1989 | Turris et al. |
| 4,924,568 A | | 5/1990 | Sato et al. |
| 4,976,915 A | | 12/1990 | Kuroki |
| 5,032,622 A | | 7/1991 | Herrington et al. |
| 5,049,591 A | | 9/1991 | Hayashi et al. |
| 5,098,776 A | | 3/1992 | Kobayashi et al. |
| 5,120,380 A | | 6/1992 | Strachan |
| 5,207,960 A | | 5/1993 | Moret de Rocheprise |
| 5,230,726 A | | 7/1993 | Smith et al. |
| 5,242,651 A | | 9/1993 | Brayden et al. |
| 5,324,117 A | | 6/1994 | Matsushita et al. |
| 5,429,847 A | | 7/1995 | Ando et al. |
| 5,460,085 A | | 10/1995 | Cappellari et al. |
| 5,501,832 A | | 3/1996 | Adams |
| 5,503,784 A | | 4/1996 | Balk |
| 5,520,758 A | | 5/1996 | Kelman et al. |
| 5,533,370 A | | 7/1996 | Kuroda et al. |
| 5,565,049 A | | 10/1996 | Simmons et al. |
| 5,640,900 A | | 6/1997 | Walton |
| 5,770,016 A | | 6/1998 | Greve |
| 5,827,430 A | | 10/1998 | Perry, Jr. et al. |
| 5,964,798 A | | 10/1999 | Imran |
| 6,281,289 B1 | | 8/2001 | Maugans et al. |
| 6,302,676 B1 | | 10/2001 | Kato et al. |
| 6,321,503 B1 | | 11/2001 | Warren |
| 6,342,283 B1 | | 1/2002 | Mozelack et al. |
| 6,388,043 B1 | | 5/2002 | Langer et al. |
| 6,472,449 B1 | | 10/2002 | Heinemann et al. |
| 6,521,555 B1 | | 2/2003 | Bodaghi et al. |
| 6,560,942 B2 | | 5/2003 | Warren et al. |
| 6,583,194 B2 | | 6/2003 | Sendijarevic |
| 6,769,484 B2 | | 8/2004 | Longmore |
| 6,817,441 B2 | | 11/2004 | Murakami et al. |
| 6,827,764 B2 | | 12/2004 | Springett et al. |
| 6,935,432 B2 | | 8/2005 | Nguyen |
| 6,983,796 B2 | | 1/2006 | Bayne et al. |
| 6,986,855 B1 | | 1/2006 | Hood et al. |
| 7,048,048 B2 | | 5/2006 | Nguyen et al. |
| 7,134,501 B2 | | 11/2006 | Johnson et al. |
| 7,155,872 B2 | | 1/2007 | Francom |
| 7,234,518 B2 | | 6/2007 | Smith |
| 7,552,767 B2 | | 6/2009 | Wood |
| 7,644,773 B2 | | 1/2010 | Richard |
| 7,677,321 B2 | | 3/2010 | Spray |
| 7,712,529 B2 | | 5/2010 | Dusterhoft et al. |
| 7,743,835 B2 | | 6/2010 | Willauer |
| 7,828,055 B2 | | 11/2010 | Willauer et al. |
| 2002/0144822 A1 | | 10/2002 | Hackworth et al. |
| 2003/0213380 A1 | | 11/2003 | Sebastian et al. |
| 2004/0241410 A1 | | 12/2004 | Fischer et al. |
| 2005/0056425 A1 | | 3/2005 | Tommy et al. |
| 2005/0126699 A1 | | 6/2005 | Yen et al. |
| 2005/0173130 A1 | | 8/2005 | Zamora et al. |
| 2005/0205263 A1 | | 9/2005 | Richard |
| 2005/0272211 A1 | | 12/2005 | Browne et al. |
| 2006/0228963 A1 | | 10/2006 | Souther et al. |
| 2007/0044891 A1 | | 3/2007 | Sellars et al. |
| 2007/0211970 A1 | | 9/2007 | Nagata et al. |
| 2008/0006413 A1 | | 1/2008 | Le Gloahec et al. |
| 2008/0296020 A1 | | 12/2008 | Willauer |
| 2008/0296023 A1 | | 12/2008 | Willauer |
| 2009/0252926 A1 | | 10/2009 | Henderson et al. |
| 2009/0301635 A1 | | 12/2009 | Corre et al. |
| 2009/0319034 A1 | | 12/2009 | Sowinski |
| 2010/0038076 A1 | | 2/2010 | Spray et al. |
| 2010/0144247 A1 | | 6/2010 | Lunn et al. |
| 2011/0178237 A1 | | 7/2011 | Ono et al. |

FOREIGN PATENT DOCUMENTS

| | | |
|---|---|---|
| JP | 6-210318 | 8/1994 |
| JP | 6210309 A | 8/1994 |
| JP | 3279962 B2 | 4/2002 |
| WO | 2004099560 A1 | 11/2004 |
| WO | 2007106429 | 9/2007 |

OTHER PUBLICATIONS

SPE Distinguished Lecturer Series[online]; retrieved on Sep. 25, 2009; retrieved from the Internet at: http://www.spe.org/spe-site/spe/spe/events/dl/Ott.pdf.

Notification of Transmittal of the International Search Report and the Written Opinion of the International Searching Authority; PCT/US2012/021273; Korean Intellectual Property Office; Mailed Sep. 26, 2012; 8 pages.

Notification of Transmittal of the International Search Report and the Written Opinion of the International Searching Authority, PCT/US2011/031768; Mailed Sep. 30, 2011; Korean Intellectual Property Office.

J. Heiland et al., "The Role of the Annular Gap in Expandable Sand Screen Completions"; Society of Petroleum Engineers; SPE Paper No. 86463; Feb. 18-20, 2004.

Lorrie A. Krebs et al., "Pitting Resistance of Nitinol Stents Before and After Implantation"; NACE International; Paper No. 09461; Corrosion Conference and Expo Mar. 22-26, 2009.

G. Scott Lester et al., "Field Application of a New Cleanable and Damage Tolerant Downhole Screen,"; Society of Petroleum Engineers, SPE Paper No. 30132, May 15, 1995.

Jiaxing (Jason) Ren et al., "Studying the Effect of Chemical Aging on the Properties of a Shape Memory Material", Offshore Technology Conference, Paper No. OTC 21317; May 2, 2011.

Witold M. Sokolowski et al., "Cold hibernated elastic memor(yC HEM) self-deployable structures"; Jet Propulsion Laboratory, California Institute of Technology, Mar. 1, 1999.

C.F. Williams et al., "A New Sizing Criterion for Conformable and Nonconformable Sand Screens Based on Uniform Pore Structures"; Society of Petroleum Engineers, SPE Paper No. 98235; Feb. 15-17, 2006.

Notification of Transmittal of the International Search Report and the Written Opinion of the International Searching Authority; PCT/US2012/041239; Mailed Jan. 2, 2013; Korean Intellectual Property Office; 9 pages.

Notification of Transmittal of the International Search Report and the Written Opinion of the International Searching Authority; PCT/US2012/048795; Mailed Feb. 14, 2013; Korean Intellectual Property Office; 10 pages.

Notification of Transmittal of the International Search Report and the Written Opinion of the International Searching Authority; PCT/US2012/048796; Mailed Feb. 8, 2013, Korean Intellectual Property Office; 6 pages.

Notification of Transmittal of the International Search Report and the Written opinion of the International Searching Authority; PCT/US2012/048798; Mailed Feb. 20, 2013, Korean Intellectual Property Office; 8 pages.

* cited by examiner

POLYMERIC COMPONENT AND METHOD OF MAKING

BACKGROUND

Injection molding is a common method of making polymeric components. Although injection molding is very efficient for making components with specific characteristics, it lacks the ability to make components with certain parameters that are desirable for specific applications. Such parameters may include filtration characteristics, density, permeability and shape memory, for example. Alternate methods of making polymeric components with control over such parameters are always of interest to those practicing in the art.

BRIEF DESCRIPTION

Disclosed herein is a method of making a polymeric component. The method includes, extruding one or more strands of a polymer, halting curing of the one or more strands, forming a mat with the extruded one or more strands, bonding the one or more strands to one another at points of contact therebetween, and curing the one or more strands.

Further disclosed herein is a polymeric component comprising a compacted mat structure having a plurality of strands of extruded polymeric material bonded at points of contact between the plurality of strands having halted curing prior to fully curing and subsequently being fully cured.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
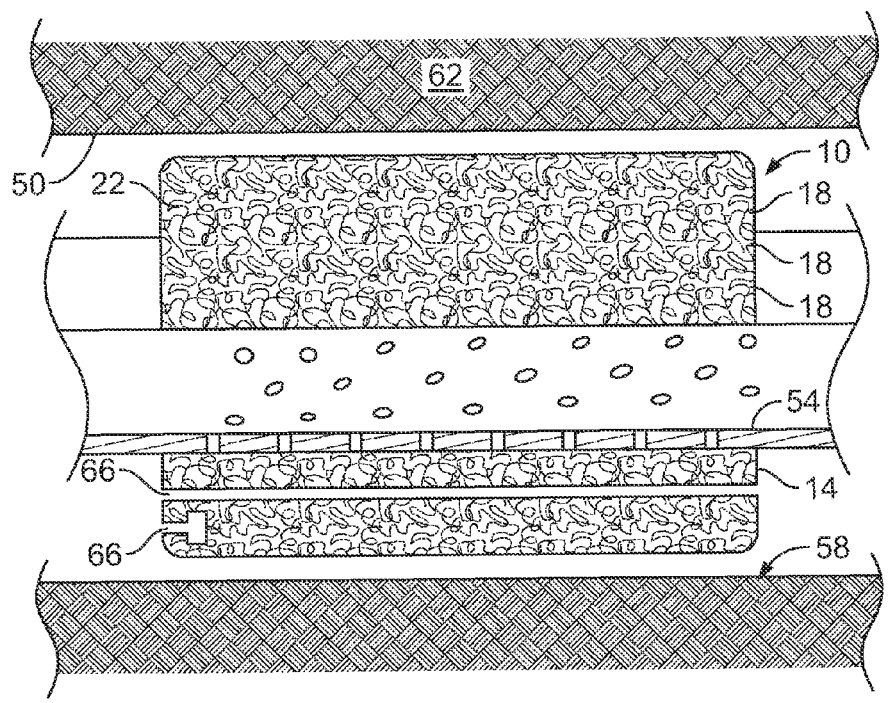
FIG. 1 depicts a quarter cross sectional view of a polymeric component applied as an expandable screen disclosed herein.

Referring to FIG. 1 an embodiment of a polymeric component disclosed herein is illustrated generally at 10. The polymeric component 10 has a compacted mat structure 14 having a plurality of strands 18 of polymeric material 22 that in this figure is an expandable screen although other components are contemplated. The polymeric material 22 may include a shape memory polymer that is a thermoplastic material, for example.

Figure 2:
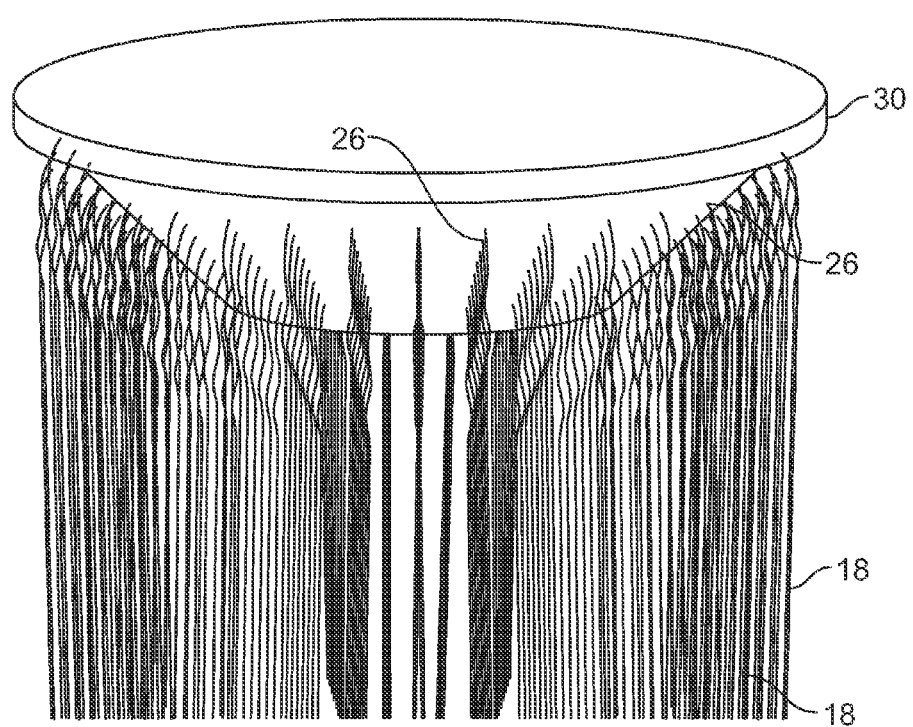
FIG. 2 depicts a partial perspective view of a spinneret shown extruding multiple strands of polymeric material.
Figure 3:
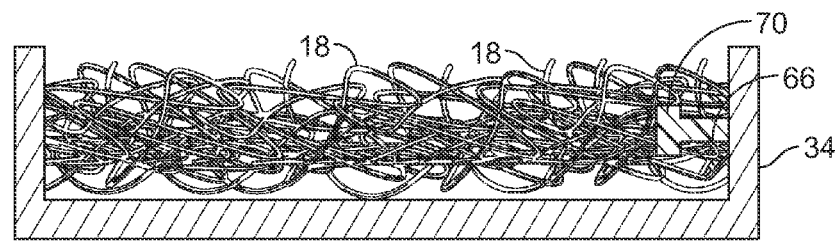
FIG. 3 a partial cross sectional view of a polymeric component disclosed herein.
Figure 4:
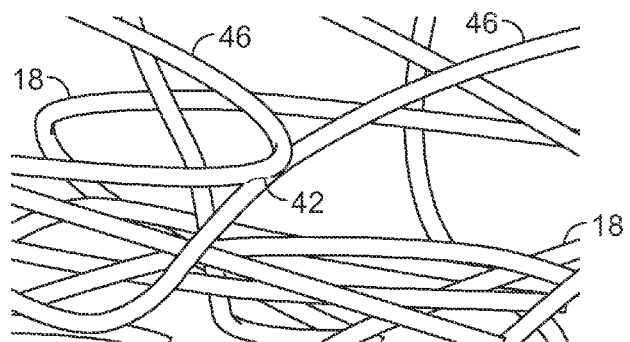
FIG. 4 depicts a magnified view of a portion of the polymeric component of FIG. 3.

Referring to FIGS. 2-4, in the embodiment illustrated a plurality of the strands 18 are extruded simultaneously from a plurality of orifices 26 of a spinneret 30 into a form 34. The strands 18 are quenched as they are formed into the mat structure 14 to effectively halt curing of the strands 18. The quenching or halting may be by cooling or exposure to a particular environment such as a chemical, for example. Regardless of the halting method employed, in addition to halting curing and cross-linking of the material, the strands 18 are at least partially hardened, thereby allowing them to maintain the mat structure 14 in a lofted condition. Attachment points 42 between strands 18, or portions of a strand 46, are created at locations of contact therebetween, effectively bonding the strands 18 together. Such attachment points 42 may be formed due to tackiness of the quenched polymer, blocking between quenched polymer surfaces in contact, by comingling of polymer chains between the strands 18 in contact prior to quench completion, or the like. As such, the mat structure 14 has structural stability yet is not fully cured. It should be noted that an operator could, by adjusting parameters associated with the extruding and halting of curing, such as temperatures of the extruded strands 18, dimensions of the orifices 26 and distance between the spinneret 30 and the form 34, for example, effectively select a desired amount of loft for the mat structure 14.

Subsequent to the halting of curing and hardening, additional curing and cross-linking of the mat structure 14 can be carried out, including fully curing and fully cross-linking of the material. The additional curing can be performed in the lofted condition, as hardened, or after additional altering of the mat structure 14 has been performed. Compaction is one example of an additional process that may be performed. Increasing temperature of the strands 18 prior to or during a compaction process can cause additional attachment points 42 to form. This process provides the operator with an additional level of control of the mat structure 14 and parameters associated therewith. Parameters such as filtration characteristics, density, permeability and shape memory, for example, can be altered to fit the application for which the polymeric component 10 is to be used. For example, if the polymeric component 10 is to be used as a screen to filter particles from a fluid flowable therethrough, characteristics of filtration efficiency and pressure drop can be selected as desired. Other applications for the mat structure 14 include, flow redirection, equalization, damping and spacing, for example.

Once in the as cured condition, the mat structure 14 may be employed in an application directly, or additional processing may first be performed. In an application wherein the mat structure 14 will be an expandable screen, additional processing can reconfigure the mat structure 14 to a stable and smaller volume than the as cured condition until it is exposed to an environment to cause it to return to the as cured condition and volume. This processing could include heating, compacting and then cooling the mat structure 14, to thereby freeze it at the smaller volume configuration. This smaller volume configuration could thus be maintained until exposed to an actuation temperature that will allow it to expand back toward the as cured volume.

The mat structure 14 as illustrated in FIG. 1 is employed as an expandable screen for a downhole borehole 50 application such as is useful in the carbon dioxide sequestration and hydrocarbon recovery industries. The screen 14 is formed into a cylindrical shape and fitted to a perforated tubular 54. The screen 14, as shown, is in the smaller volume configuration so that it can be run into the borehole 50 without making detrimental contact with walls 58 of the borehole 50. Once deployed at the desired location within the borehole 50 high temperatures that are typically encountered in downhole in earth formations or supplied by an operator can heat the screen 14. In this embodiment, the increased temperature will cause the screen 14 to expand toward the volume of the as cured configuration and into contact with the walls 58 of the borehole 50. Such contact is desirable to provide structural support to the formation 62 and minimize erosion of the formation 62 that can occur if an annular gap is allowed to exist between the screen 14 and the walls 58 of the borehole 50.

Optionally, voids 66 can be formed in the mat structure 14 to create flow channels, attachment hard-points, or other desirable features. To create the voids 66, negatives 70 of the shape the voids 66 will have are positioned within the form 34 prior to strands 18 being extruded into the form 34. After the mat structure 14 has been cured the negatives 70 are removed from the mat structure 14. One embodiment employs lost core technology to remove the negatives 70. This technology uses a meltable material, such as wax, for the negatives 70 that is melted and drained out of the voids 66 when desired. In this case the melting temperature of the negatives 70 should be greater than the curing temperature of the polymeric material 22 and the post cure heating temperature during the compaction process, but less than the melting temperature of the polymeric material 22 itself.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method of making a polymeric component, comprising:
    extruding one or more strands of a polymer around at least one meltable member;
    halting curing of the one or more strands;
    forming a mat with the extruded one or more strands around at least one meltable member;
    bonding the one or more strands to one another at points of contact therebetween;
    curing the one or more strands;
    melting the at least one meltable member; and
    draining the melted at least one meltable member to leave at least one void in the mat.

2. The method of making a polymeric component of claim 1, wherein the curing includes heating of the one or more strands.

3. The method of making a polymeric component of claim 1, wherein the extruding is through a spinneret.

4. The method of making a polymeric component of claim 1, wherein the halting is by cooling the one or more strands.

5. The method of making a polymeric component of claim 1, wherein the extruding is into a form.

6. The method of making a polymeric component of claim 1, wherein the curing includes cross-linking.

7. The method of making a polymeric component of claim 1, wherein the at least one meltable member is made of wax.

8. The method of making a polymeric component of claim 1, wherein the void provides a flow channel.

9. The method of making a polymeric component of claim 1, wherein the void is an attachment hard-point.

10. The method of making a polymeric component of claim 1, further comprising bonding strands to one another at additional points of contact.

11. The method of making a polymeric component of claim 10, further comprising cross-linking the bonded strands.

12. The method of making a polymeric component of claim 1, wherein the compacted and cooled mat is an expandable screen.

13. The method of making a polymeric component of claim 1, further comprising controlling parameters of the polymeric component 14. The method of making a polymeric component of claim 13, wherein the parameters are selected from the group consisting of filtration characteristics, density, permeability and shape memory.

15. The method of making a polymeric component of claim 1, further comprising:
    heating the mat;
    compacting the mat into a reduced volume;
    cooling the mat; and
    hardening the mat.

16. The method of making a polymeric component of claim 15, wherein the compacted mat is an expandable screen.

* * * * *